(12) United States Patent
Selby (10) Patent No.: US 6,895,381 B1
(45) Date of Patent: May 17, 2005

(54) METHOD AND SYSTEM FOR MANAGEMENT OF A WAIT LIST FOR RESERVED PURCHASES

(75) Inventor: David A. Selby, North Boarhunt Near Fareham (GB)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 09/628,399

(22) Filed: Aug. 1, 2000

(51) Int. Cl.[7] ............................................... G06F 17/60
(52) U.S. Cl. ................................. 705/6; 705/7; 705/15
(58) Field of Search ............................ 705/5, 6, 7, 15, 705/28

(56) References Cited

U.S. PATENT DOCUMENTS

| | | |
|---|---|---|
| 4,775,936 A | 10/1988 | Jung |
| 5,191,523 A | 3/1993 | Whitesage |
| 5,255,184 A | 10/1993 | Hornick et al. |
| 5,270,921 A | 12/1993 | Hornick |
| 5,652,867 A | 7/1997 | Barlow et al. |
| 5,832,454 A | 11/1998 | Jafri et al. |
| 5,897,620 A * | 4/1999 | Walker et al. |
| 5,918,209 A | 6/1999 | Campbell et al. |

FOREIGN PATENT DOCUMENTS

JP          06176038    *    6/1994

OTHER PUBLICATIONS

Ng et al; The strategic role of unused service capacity; 1999; International Journal of Service Industry Management v10n2 pp: 211; dialog copy 21 pages.*

Arrendell, Stephen; AAL waitlist policy change is instituted; Feb. 1989; Travel Weekly v48, n17, p65(2); dialog copy 2 pages.*

L. R. Weatherford & S. E. Bodily, A Taxonomy and Research Overview of Perishable–Asset Revenue Management: Yield Management, Overbooking, and Pricing, 40 Operations Research 5, pp. 831–844 (1992).

* cited by examiner

Primary Examiner—Thomas A. Dixon
(74) Attorney, Agent, or Firm—Synnestvedt & Lechner LLP; John R. Pivnichny (57) ABSTRACT

The present invention provides a system and method for predicting the likelihood of materialization of pending waitlisted reservations for the purchase of perishable commodities. Details pertaining to perishable commodities for which reservations for purchase have been made in the past, are gathered and analyzed as are details pertaining to reservation requests stored in a wait list. Based upon the analysis, the likelihood that a particular pending reservation will actually be purchased or "materialize" if it is taken off the wait-list and actually reserved is determined and this information is utilized for yield management.

27 Claims, 5 Drawing Sheets

METHOD AND SYSTEM FOR MANAGEMENT OF A WAIT LIST FOR RESERVED PURCHASES

CROSS-REFERENCE TO RELATED APPLICATIONS

This application is related to U.S. application Ser. No. 09/628,400, filed Aug. 1, 2000, and U.S. Application Ser. No. 09/628,398, filed Aug. 1, 2000.

BACKGROUND OF THE INVENTION

1. Field of the Invention

This invention relates generally to purchasing and reservation systems and, in particular, the present invention relates to improvement of yield management with respect to ranking of reservations that are on a "wait list" for the purchase of perishable commodities such as airline seats, hotel rooms and the like.

2. Description of the Related Art

Common carriers such as commercial buses, trains, and airlines, and service industries such as hotels and rental car companies, face complex issues when conducting strategic and operational planning. Businesses of this type deal with "perishable commodities" which are defined as commodities that cannot be inventoried and share three common characteristics: perishability, "fixed" capacity, and segmentability. Perishability means that each commodity ages or becomes unavailable, and thus has no value, after a certain date, time or similar temporal event. "Fixed" capacity implies a high cost of adding an incremental unit such that capacity is regarded as static and unchanging. Segmentability refers to the ability to segment customers based on a willingness to pay using different rates and/or different purchase restrictions, such as the date of purchase relative to the date of use. Examples of perishable resources include airline seats, hotel room nights, rental car days and similar products or services such as described in L. R. Weatherford & S. E. Bodily, A Taxonomy and Research Overview of Perishable-Asset Revenue Management: Yield Management, Overbooking, and Pricing, 40 Operations Research 5, pp. 83144 (1992), the disclosure of which is incorporated herein by reference.

Organizations marketing and selling perishable commodities spend numerous hours trying to choreograph the inter-related elements of scheduling, routing, and crew/staff rotations while maximizing profits and efficiency. Maximum profits are achieved when all of the available perishable commodities (e.g., with respect to airlines, all seats on a given flight) are sold on the perishing date (e.g., with respect to airlines, at the time the given flight departs). Maximum customer satisfaction occurs when perishable commodities reserved by consumers are available on the perishing date. The marketer/seller of perishable commodities must therefore constantly balance these two competing interests so that all of the commodities are sold and are available for all those who reserved them.

The terms "revenue management" and "yield management" are now common terms in service industry parlance to describe the use of statistical analysis to manage itinerary control, inventory control, over-booking and pricing so as to increase the revenue yield per unit of available capacity. Based on the statistical analysis, forecasting, optimization models, and the like, determinations are made as to which reservation requests to accept and which to reject in order to maximize revenues.

The airline industry presents a typical example of a service industry which utilizes yield management techniques to try to maximize profits while coping with the complicated operational issues inherent to the industry. An airline passenger may have five or more carriers to choose from when planning a trip from point A to point B. Airlines are constantly seeking ways to maximize their efficiency and profits and make tremendous efforts to win and maintain customer loyalty. Airline passengers' primary criteria in selecting airlines include safety, comfort, and timeliness. Given the relatively wide selection of carriers available to airline passengers, and the ease with which reservations can be made and changed, a failure in any of these areas by an airline is likely to result in a migration of passengers to other airlines.

It is a well-known practice in the airline industry to overbook flights in an attempt to assure that the flights are fully loaded with passengers, thereby maximizing the profits for the airlines. The policy of overbooking is based upon practical considerations. For various reasons, not all flights reserved are actually purchased, i.e., while they may have been reserved, they do not actually "materialize". For example, air travelers frequently reserve seats which they have no intention of using so that they may be assured of having the most convenient itinerary possible. Take, for example, an air passenger who is based in Philadelphia and needs to be in London, England on a particular Tuesday by 1 p.m. The passenger might reserve a first itinerary comprising a direct flight from Philadelphia to London on British Airways, arriving in London at 12:30 p.m. on Tuesday; a second itinerary comprising a first leg from Philadelphia to John F. Kennedy Airport in New York on American Airlines and a second leg from John F. Kennedy Airport to London via British Airways, arriving in London at 11:30 a.m. on the same Tuesday; and a third itinerary comprising a first leg from Baltimore/Washington International Airport to Dulles Airport in Washington, D.C., and a second leg from Dulles Airport to London, arriving in London, again, on the same Tuesday at 10:00 a.m., both legs being on U.S. Airways. Clearly, the passenger can only use one of the itineraries; however, for convenience sake, the user may wait until the last minute to decide which of the three itineraries to utilize, and the user may or may not proactively cancel the two unused (i.e., unmaterialized) itineraries.

Similarly, the passenger may not know with any certainty what time he or she will be able to leave London on a return flight. For example, suppose that the passenger is traveling to London on business and will be a conducting meeting having an unknown duration. The passenger may reserve several outgoing flights spaced several hours apart so as to be assured of having a reservation on a flight leaving within a reasonably short time after the conclusion of the business meeting.

While providing convenience for the air passenger, such reservation practices make it particularly difficult for airlines to assure that all flights depart without empty seats. To compensate for unmaterialized reservations, airlines have adopted the policy of overbooking flights with the understanding that a certain percentage of the seats on "reserved" status by passengers will never actually materialize. In a perfect world, the airlines could always tell with precision precisely how many passengers would over-reserve for a particular flight and would then overbook for that flight by the exact number so that all seats would be filled. In reality, however, it is impossible to predict precisely how may reservations will not materialize; thus, airlines frequently end up with either too few seats sold, thereby losing revenues by flying aircraft with empty seats, or too many seats sold, requiring the airlines to "bump" passengers onto the next available flight to their destination. While most airlines will in some manner compensate passengers that have been bumped, for example, by providing them with vouchers good towards future flights on the airline, free hotel accommodations, and the like, such a practice, is costly for the airlines, is usually extremely inconvenient to the airline traveler, and can lead to once-loyal passengers migrating to a competitor airline.

In an attempt to overcome the above problems, systems have been developed which track the frequency with which a particular flight experiences overbooking or underbooking and, based on this statistical analysis, increases the point at which that particular flight is considered "closed" to a number greater than 100% of the capacity of the aircraft, with the exact percentage greater than 100% being based upon the historical data for that flight. Examples of such systems can be found in, for example, U.S. Pat. No. 5,918,209 to Campbell et al., U.S. Pat. No. 5,255,184 to Hornick et al., and U.S. Pat. No. 4,775,936 to Jung, all of which are incorporated fully herein by reference.

Each of the prior art systems known to the applicant involve statistical analysis of the perishable commodity in question (e.g., the particular flight, airline seat, hotel room, rental car) to determine the history of booking with respect to the perishable commodity over a period of time. Thus, for example, a particular flight (e.g., Flight Number 250 from Philadelphia to London) and/or combination of legs comprising an entire itnerary, might be analyzed to determine the likelihood that the particular flight(s) will be fully sold out, based on the overall past history of overbooking or underbooking for the flight(s). Additional factors considered by the prior art systems may include whether or not a particular event is associated with the flight (e.g., did a particular flight experience different sales characteristics when the flight was associated with travel to and from the Olympic Games?), or whether any sales promotions are associated with the flight (e.g., was it necessary to offer discounted fares in order to fill up the seats?). While the use of such systems provides assistance to the airlines, their focus is always on very general statistical history of a specific booking itself, and guesses regarding the impact of outside factors such as event association or promotional fare structures.

None of the prior art systems analyze: details of the individual reservations so that the reservations can be characterized as having one or more traits; characteristics of the consumers who reserve the bookings so that the consumers (or potential consumers) can be characterized as having one or more traits; or the reasons why the person making the reservation actually did (or did not) purchase the reserved booking. The Applicant has determined, however, that it is only by understanding why a particular booking actually materializes that better prediction models can be developed so as to optimize the yield management or revenue management system. If the details of the booking (other than simply the flight number) and characteristics of the persons making the reservations were to be factored into the analysis, the effectiveness of the overbooking policy by the airlines could be increased. However, none of the prior art systems attempt to make such an analysis.

In addition, none of the prior art systems adequately address the optimization of promoting potential purchasers in a "wait list" from "wait-listed" status to reserved status. Once the available reservations for a particular perishable commodity are considered closed (e.g., all seats for a particular airline flight or all rooms for a particular hotel on a given date are considered sold) it is a common practice for the seller of the commodity to compile a list, usually referred to as a "wait list," of potential purchasers who may still be interested in purchasing the perishable commodity in the event that one or more of the reservations becomes available due to, for example, cancellations of current reservations. Potential purchasers who are "wait listed" typically are under no commitment to purchase the canceled reservations when they become available. Often the wait listed purchasers choose to or are compelled to make alternative reservations in order to satisfy their need for the reservation in the first place, and this information may not be conveyed back to the organization keeping the wait list, resulting in listings on the wait list which are invalid (i.e., although they are on the wait list, they will never choose to purchase the canceled reservation because they have made an alternative commitment).

It is to the benefit of the seller of the perishable commodity to promote potential purchasers from the wait list to a reserved status based on the likelihood that the promotee will actually accept the promotion, i.e., agree to purchase the canceled reservation. The current practice of wait-list promotion is based purely on the skill and judgement of the person charged with making the promotion (e.g., in the context of airline ticket sales, the route controller). While certain individuals may have a better feel for who to promote and who not to promote, often success is based as much on luck as it is on skill.

Accordingly, it would be desirable to have a method and system for promoting wait-listed individuals from a wait-list status to a reserved status which is based on statistical analysis and the likelihood that, if promoted, the reservation will actually materialize, so that those wait-listed reservations that are more likely to materialize will be given the first opportunity to move from a wait list status to a reserved status.

SUMMARY OF THE INVENTION

It is therefore an object of the invention to provide a system and method for predicting the likelihood of materialization of pending wait-listed reservations for the purchase of perishable commodities, which system and method provides for the gathering and analysis of details pertaining to perishable commodities for which reservations for purchase have been made in the past, gathering and analysis of details pertaining to perishable commodities for which reservations for purchase are currently pending but closed, and determining, based upon the analysis, the likelihood that a particular wait-listed pending reservation will actually be purchased or "materialize" if promoted from a wait list status to a reserved status.

In a first embodiment of the present invention, the present invention comprises a method for materialization forecasting with respect to wait-listed reservations made by persons for the potential purchase of perishable commodities, comprising the steps of: gathering past reservation information relating to past reservations for perishable commodities that have already perished, gathering wait list reservation information relating to wait-listed reservations for perishable commodities that have not yet perished, comparing the past reservation information and the wait list reservation information, calculating, based on the comparison, the likelihood that the wait-listed reservations will materialize if promoted to reserved status, ordering the wait-listed reservations based on their likelihood of materialization; and outputting the ordered wait-listed reservations.

In a second embodiment of the present invention, the invention comprises computer-readable code stored on media for conducting materialization forecasting with respect to wait-listed reservations made by persons for the potential purchase of perishable commodities, comprising first subprocesses for gathering past reservation information relating to past reservations for perishable commodities that have already perished, second subprocesses for gathering wait list reservation information relating to wait-listed reservations for perishable commodities that have not yet perished, third subprocesses for comparing the past reservation information and the wait list reservation information, fourth subprocesses for calculating, based on the comparison, the likelihood that the wait-listed reservations will materialize if promoted to reserved status, fifth subprocesses for ordering the wait-listed reservations based on their likelihood of materialization, and sixth subprocesses for outputting the ordered wait-listed reservations.

DETAILED DESCRIPTION OF THE PREFERRED EMBODIMENTS

In the following detailed description of the preferred embodiments, references made to the accompanying drawings which form a part hereof, and in which is shown by way of illustration, an embodiment in which the invention may be practiced. It is understood that other embodiments may be utilized, and changes may be made to both that process and the structure without departing from the scope of the present invention.

As used herein, the following terms have the following meanings:

Flight Leg—used in the context of airline travel to describe a single flight segment comprising a take-off from a departure point through the immediately-following landing at a destination point.

Itinerary—the sequential outline of a trip or other sequence of events, or a proposed trip or sequence of events. For example, in the context of airline travel, the term "Itinerary" describes the sequence of flight legs beginning at the originating (i.e., the first) departure point and ending at the ultimate (i.e., final) destination point. An airline travel itinerary can be "one-way" or "roundtrip" using the ordinary and customary meaning of these terms. An itinerary with respect to hotel travel would be the sequence of nightly hotel stays in a particular trip, beginning with the first stay and ending with the last.

Demographic Information—statistical characteristics of a population; in connection with the present invention, the demographic information pertains to statistical characteristics relating to consumers of perishable commodities including, without limitation, the age, gender, national origin, citizenship, country of residence, occupation, annual income, marital status, and frequency of purchase (of the perishable commodity) of the consumer.

Commodity Details—narrow, detailed information pertaining to a commodity; for example, commodity details in connection with an airline seat include, without limitation, carrier name, flight origin, flight destination, booking class, flight distance, departure time, connection time, arrival time, departure date, arrival date, flight duration, number of distinct legs comprising a complete one-way itinerary, aircraft type, aircraft capacity.

Point-of-Sale (POS) Information—statistical information available from the location where the sale of the commodity occurred. This information may include, without limitation, POS type (travel agent, direct sale, etc.), POS country, booking carrier, booking recency, change recency (i.e., how recent a change in the booking was made), fare code, number of passengers traveling with the consumer making the reservations, length of stay associated with the reservation, time between booking date and flight date, payment status.

Materialization Information—statistical information identifying a reservation as having either materialized or not materialized.

Past Reservation Information—commodity details, demographic information, POS information and/or materialization information relating to past reservations for perishable commodities that have already perished. It may also include information regarding the status of a past reservation as having been wait-listed. Upon expiration (perishing) of the commodity, the information pertaining thereto becomes past reservation information because it then relates to reservations that can no longer be filled.

Current Reservation Information—commodity details, demographic information, and/or POS information relating to current (i.e., pending) reservations for perishable commodities. Upon expiration (perishing) of the commodity, the current reservation information becomes past reservation information because it then relates to reservations that can no longer be filled.

Wait-List Reservation Information—commodity details, demographic information, and/or POS information relating to wait-listed reservations for perishable commodities and the individuals corresponding to the wait-listed reservations.

Figure 1:
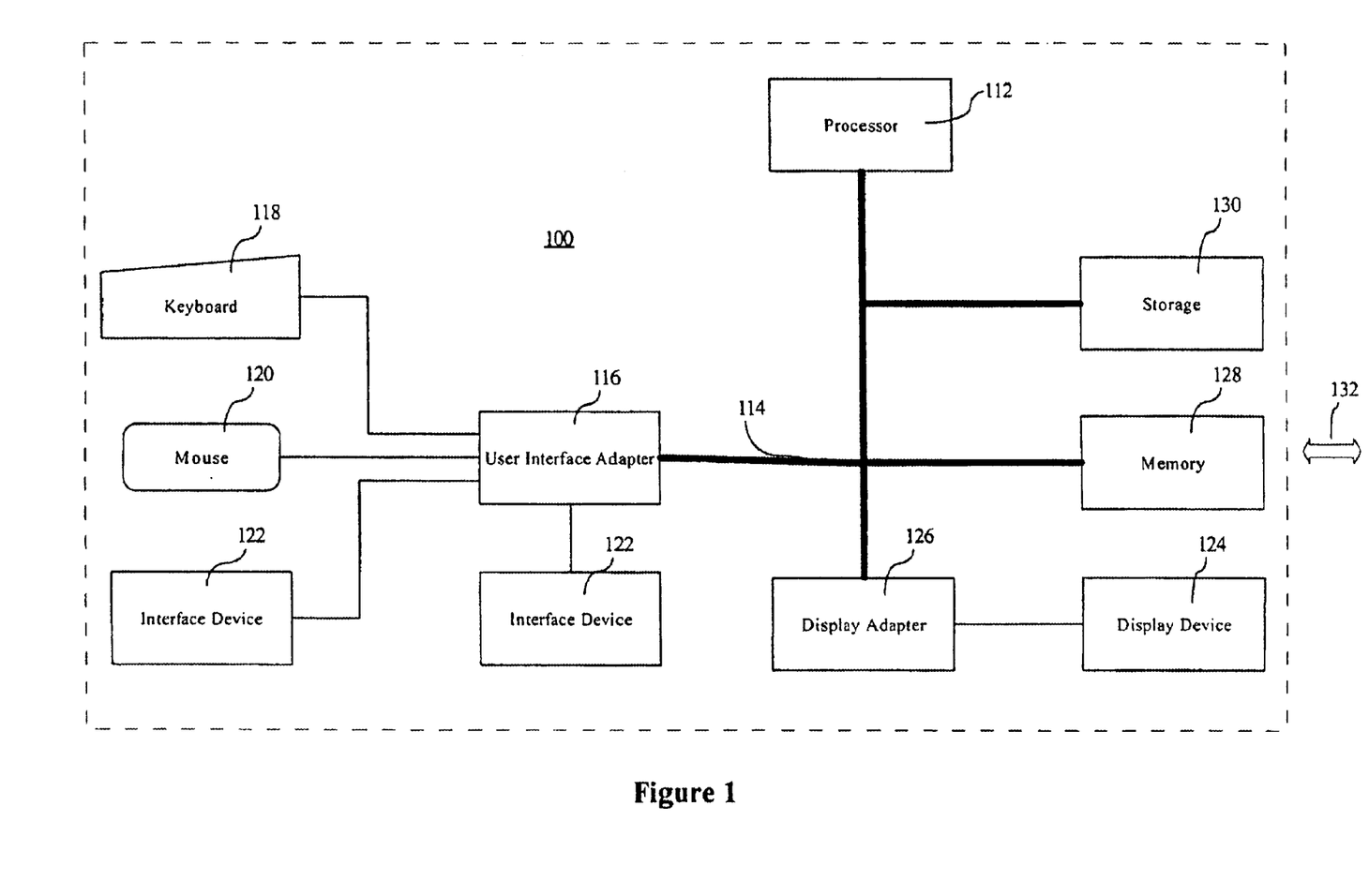
FIG. 1 illustrates a representative workstation hardware environment in which the present invention may be practiced.

FIG. 1 illustrates a representative workstation hardware environment in which the present invention may be practiced. The environment of FIG. 1 comprises a representative single user computer workstation 100, such as a personal computer, including related peripheral devices. The workstation 100 includes a microprocessor 112 and a bus 114 employed to connect and enable communication between the microprocessor 112 and the components of the workstation 100 in accordance with known techniques. The workstation 100 typically includes a user interface adapter 116, which connects the microprocessor 112 via the bus 114 to one or more interface devices, such as keyboard 118, mouse 120, and/or other interface devices 122, which can be any user interface device, such as a touch sensitive screen, digitized entry pad, etc. The bus 114 also connects a display device 124, such as an LCD screen or monitor, to the microprocessor 112 via a display adapter 126. The bus 114 also connects the microprocessor 112 to memory 128 and long term storage 130 which can include a hard drive, tape drive, etc.

The workstation 100 communicates via a communications channel 132 with other computers or networks of computers. The workstation 100 may be associated with such other computers in a local area network (LAN) or a wide area network, or the workstation 100 can be client in a client/server arrangement with another computer, etc. All of these configurations, as well as the appropriate communications hardware and software, are known in the art.

Figure 2:
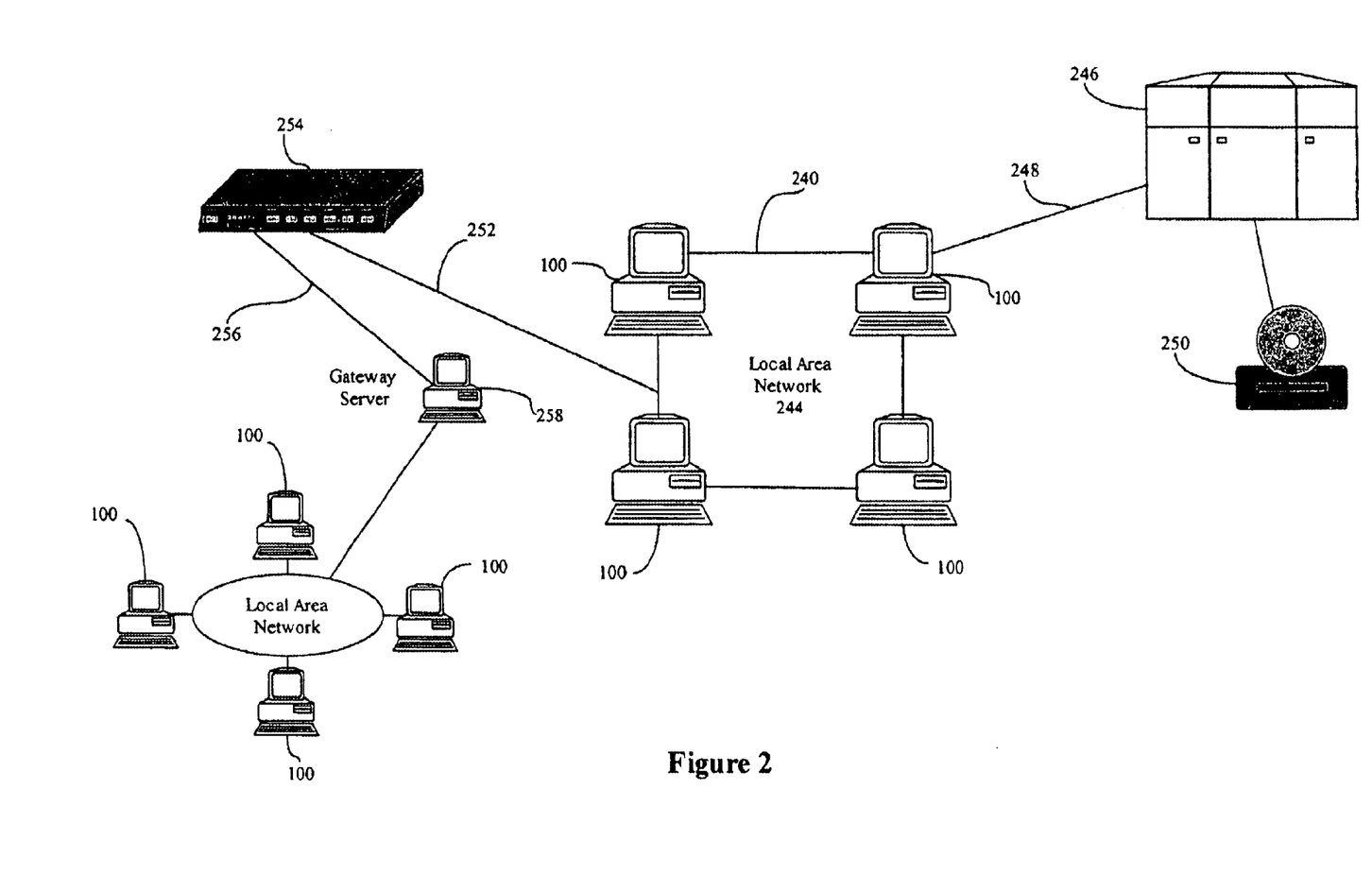
FIG. 2 illustrates a data processing network in which the present invention may be practiced.

FIG. 2 illustrates a data processing network 240 in which the present invention may be practiced. The data processing network 240 includes a plurality of individual networks, including LANs 242 and 244, each of which includes a plurality of individual workstations 100. Alternatively, as those skilled in the art will appreciate, a LAN may comprise a plurality of intelligent workstations coupled to a host processor.

Still referring to FIG. 2, the data processing network 240 may also include multiple mainframe computers, such as a mainframe computer 246, which may be preferably coupled to the LAN 244 by means of a communications link 248. The mainframe computer 246 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 246 may also be coupled to a storage device 250, which may serve as remote storage for the LAN 244. Similarly, the LAN 244 may be coupled to a communications link 252 through a subsystem control unit/ communication controller 254 and a communications link 256 to a gateway server 258. The gateway server 258 is preferably an individual computer or intelligent workstation which serves to link the LAN 242 to the LAN 244.

Those skilled in the art will appreciate that the mainframe computer 246 may be located a great geographic distance from the LAN 244, and similarly, the LAN 244 may be located a substantial distance from the LAN 242. For example, the LAN 242 may be located in California, while the LAN 244 may be located in Texas, and the mainframe computer 246 may be located in New York.

Software programming code which embodies the present invention is typically stored in permanent storage of some type, such as the permanent storage 130 of the workstation 100. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

A preferred embodiment of the present invention will now be discussed with reference to FIGS. 3–5.

Figure 3:
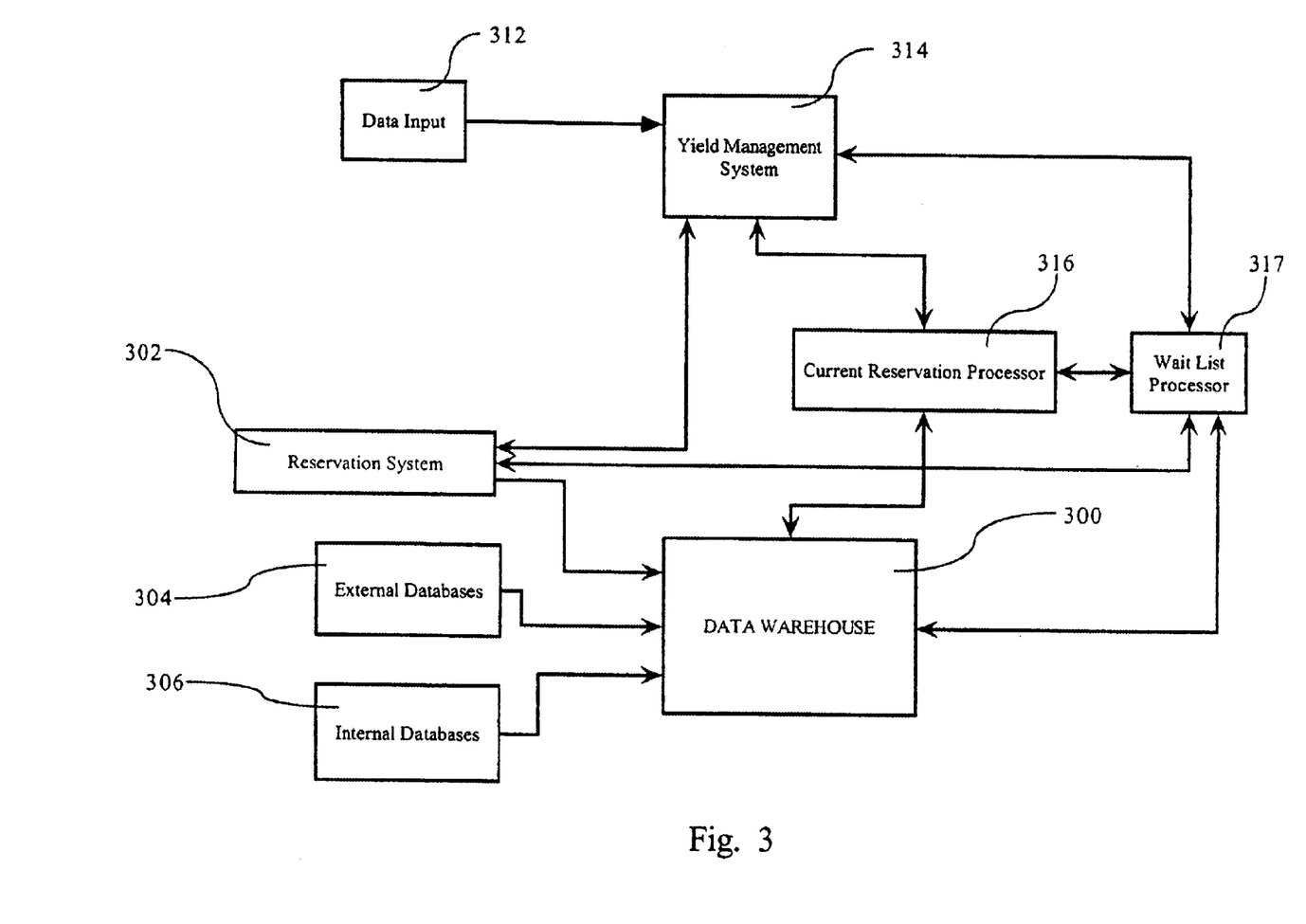
FIG. 3 is a block diagram of an exemplary embodiment of a system constructed in accordance with the present invention.

FIG. 3 is a block diagram of an exemplary embodiment of a system constructed in accordance with the present invention. As shown in FIG. 3, a data warehouse 300 stores reservation information, both past and current, as well as wait-list reservation information. The reservation information can be directed to data warehouse 300 from any known source, for example, from a reservation system 302 or from external or internal databases 304 and 306. External databases 304 and internal databases 306 are simply "reservoirs" of pertinent data which contain data of interest. Internal databases are kept by an organization for many purposes, e.g., frequent flyer information and marketing information might be kept in an internal database by an airline. External databases are maintained by private outside sources such as travel agents and data-gathering companies and typically the information they retain is sold to the using organization for profit, e.g., demographic information is often solicited by a private data-gathering organization in exchange for prizes or contest-entries, and the information obtained is then sold to an end user.

The data warehouse 300 may be updated on a real time basis, i.e., as new reservations are made, data regarding the new reservation is immediately stored in the data warehouse 300 so it is immediately available for use in analysis and/or modeling. The new reservation information (e.g., passenger information, flight information, etc. related to a reservation currently being made) is first input to a conventional yield management system 314 via data input 312. Data input 312 can comprise, for example, a keyboard or a server which receives data input from other sources such as the internet, an intranet, or other input source. The yield management system operates in connection with the reservation system 302 in a known manner to confirm (or deny) a reservation request after a determination is made that reservation spaces are (or are not) available taking into account the overbooking criteria established by the yield management system.

Connected between data warehouse 300 and yield management system 314 is a current reservation processor 316 which is capable of two-way communication between yield management system 314 and data warehouse 300. The data warehouse 300 is queried by current reservation processor 316 to find past reservation information having similar characteristics to the current reservation information.

In accordance with the present invention, a wait-list subprocessor 317 is connected for two-way communication with current reservation processor 316, data warehouse 300, reservation system 302, and yield management system 314. Wait-list subprocessor 317 operates in connection with current reservation processor 316 to store wait-list reservation information pertaining to reservation requests that have been rejected because reservations for the perishable commodity were closed to the reservation request (e.g., based on a decision by yield management system 314). In the preferred embodiment, this information will only be stored in wait-list subprocessor 317 if the party or person attempting to make the rejected reservation indicates a desire to be wait-listed, thereby "weeding out" those who have no desire to be wait-listed.

As described and claimed in commonly assigned copending U.S. Application, "Method and System for Prediction of Materialization of a Reserved Purchase," Ser. No. 09/628,400, filed concurrently herewith, and incorporated fully herein by reference, current reservation processor 316 examines all flights which have similar characteristics to those of the current reservation and determines the likelihood that the current reservation will materialize, processes the reservation through the yield management system 314, and either makes the reservation or rejects it. If the current reservation request is rejected, in accordance with the present invention, the current reservation information pertaining to the rejected reservation is stored in wait list subprocessor 317 as wait-list reservation information.

Periodically (as often or as seldom as desired), wait-list subprocessor queries data warehouse 300 to find past reservation information having similar characteristics to the wait-list reservation information. In addition to looking at historical data regarding prior flights, wait-list subprocessor 317 may also look at data regarding previous wait-listed reservations that did and did not materialize. Based on this query and analysis of the data retrieved, wait-list subprocessor 317 reorders the wait-listed reservations so that those showing a propensity to materialize are placed on the top of the list and those showing less of a propensity to materialize are placed at the bottom of the list. This can be accomplished, for example, by assigning each wait-listed reservation a score between 0 and 100, with higher numbers being assigned to those more likely to materialize and lower numbers being assigned to those less to materialize, and then putting the wait-listed reservations in chronological order based on their scores. When it comes time to move a reservation from a wait-list status to a reserved status, the reservation with the highest score is selected first, increasing the likelihood that the reservation, formerly wait-listed, will materialize.

Using the present invention, the data warehouse 300 is searched for all previous reservations having the same attributes as the wait-listed reservations, and the materialization information for these past reservations is evaluated. Based on this information, if it is determined that reservations of a particular type have a 98% materialization rate, this factor is applied to the wait list, and if, at the time a reservation becomes available, there are no wait-listed reservations that have a higher materialization percentage, then that wait-listed reservation is transferred to reserved status.

Thus, in accordance with the present invention, each reservation stored in the wait list will be weighted based on its tendency to materialize, and a much more accurate booking will result when a reservation becomes available.

Figure 4:
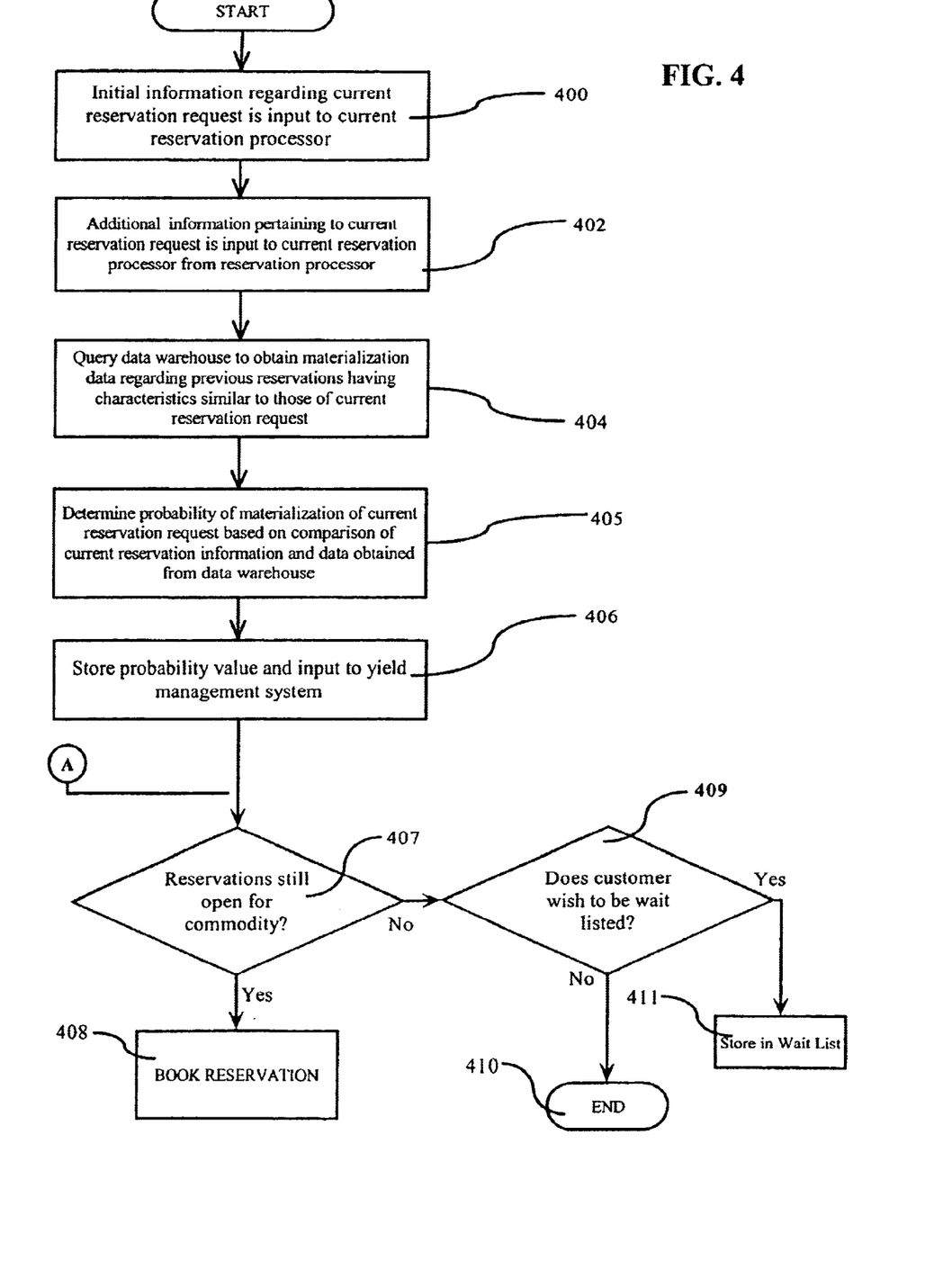
FIG. 4 is a flowchart illustrating the steps of the method of the present invention.

FIG. 4 is a flowchart illustrating the basic steps of the method of the present invention. At step 400 information regarding a current reservation request is input to the current reservation processor 316 via the yield management system 314. The information regarding the current reservation request will include the basic information given by a potential purchaser: travel date(s) and time(s); number of passengers; age categories of passengers (e.g., under 12, senior citizen, etc.); gender of passengers; departure and destination location(s); type of travel (e.g., business); payment details. Based on this information, the reservation system 302 also supplies additional information to current reservation processor 316 at step 402. This information is derived based upon the current reservation information discussed above. For example, based on the input information by the potential purchaser, the reservation system might indicate to current reservation processor 316 that Flight 250 from Philadelphia to London will satisfy the travel dates, times, departure and destination locations, etc. requested by the potential purchaser.

At block 404, the current reservation processor queries the data warehouse 300 to obtain materialization data regarding previous reservations made which possess data characteristics similar to those of the current reservation request. At block 405, based upon the comparison of the past materialization data from the data warehouse 300 and the current reservation information input at step 400, the probability of materialization for the current reservation request is determined and stored in the current transaction processor 316. At step 406, the stored information regarding the materialization probability of the current reservation request is input to the yield management system 314, which utilizes this information to authorize or deny the reservation of desired flight or flights requested by the potential purchaser.

If, at step 406, the yield management system 314 determines that the current reservation request warrants authorization of a reservation, at step 407 a determination is made as to whether or not reservations are still open for the requested commodity. If reservations are open, at step 408 the current reservation request is booked. If, however, at step 407 it is determined that reservations are closed, at step 409 a determination is made as to whether or not the customer desires to be wait-listed. If the customer does not wish to be wait-listed, at step 410 the process ends. If, however, at step 409 the customer indicates a desire to be wait-listed, at step 411 the current reservation request is moved to the wait-list and stored there as a wait-list request.

Figure 5:
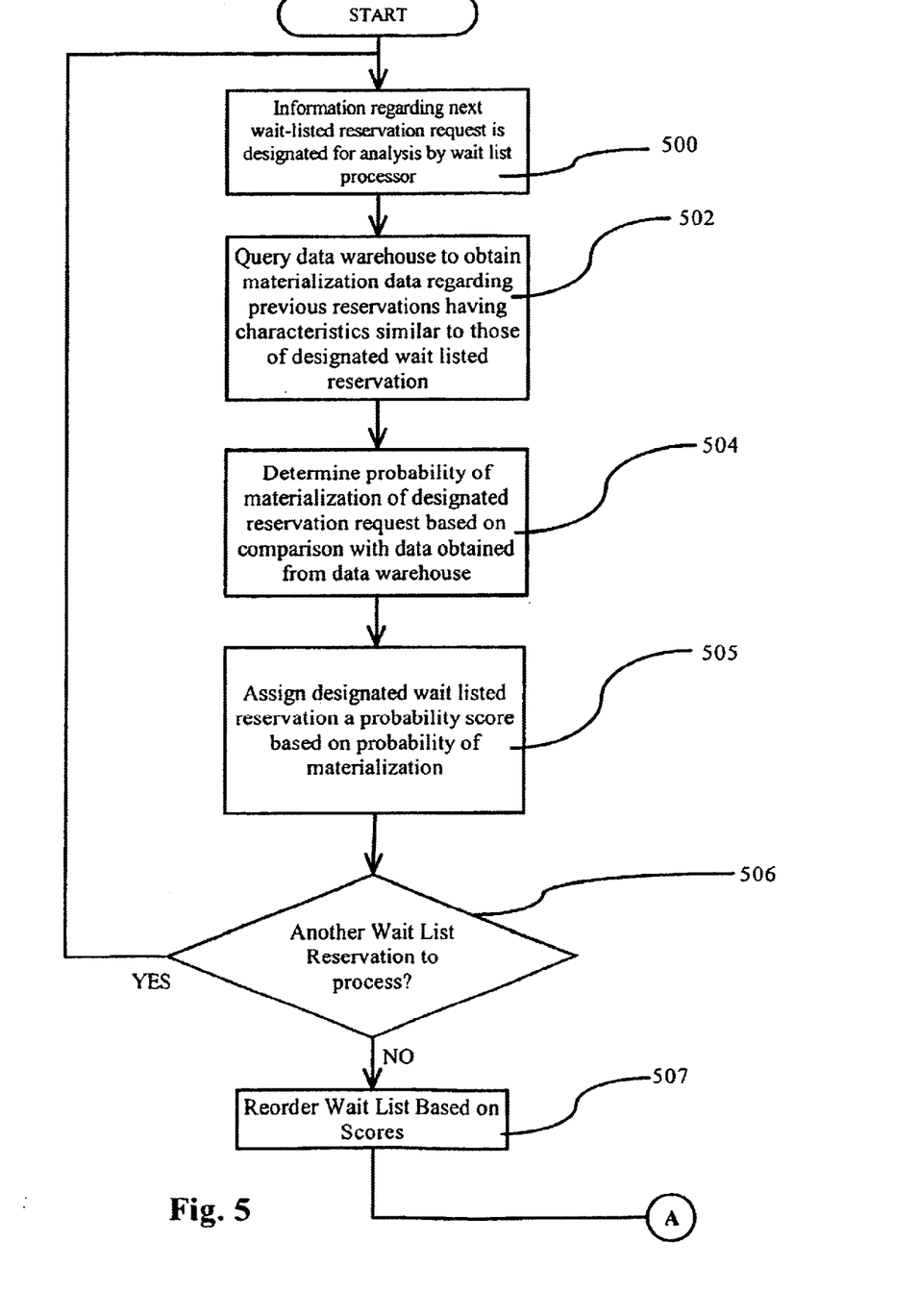
FIG. 5 is a flowchart illustrating a process involved in evaluating wait-list requests and placing them in order in accordance with the present invention.

FIG. 5 illustrates a process involved in evaluating wait-list requests and placing them in order based upon their likelihood of materialization. As noted above, the process steps described with respect to FIG. 5 can be performed as often or as seldom as desired. From a practical standpoint, it is most sensible to perform these process steps as close as possible to the point in time at which a decision is made to move wait-listed reservations to a reserved status so that the most current historical data can be applied to the wait-list. For example, with respect to airline reservations, it may be desirable to update the wait-list seven days prior to departure, since it is frequent that an airline will consider reservations which have not been paid for by this date to expire, thereby leaving room for wait-listed persons to move onto the reserve list.

Referring to FIG. 5, at step 500, information regarding the next wait-listed reservation request is designated for analysis by wait-list processor 317. At step 502, wait-list processor 317 queries the data warehouse 300 to obtain materialization data regarding all previous reservations having characteristics similar to those of the designated wait-listed reservation.

At step 504, the past reservation data is analyzed to determine the probability of materialization of the designated reservation request. Based on this analysis, at step 505 the designated wait-listed reservation is assigned a promotion probability score, e.g., a number between 0 and 1, based on its probability of materialization. If desired, to "score" more profitable reservations with a higher value (so that, for example, a more profitable, non-discounted fare reservation is selected for promotion before a less profitable, discounted fare reservation), the revenue value of all fares in the wait list can be multiplied by the promotion probability score so that the revenue value is taken into account.

At step 506, a determination is made as to whether there are additional wait list reservations to analyze. If the answer is affirmative, the process proceeds back to step 500 and analysis of the next wait-listed reservation begins. If there are no additional wait-list reservations to process, at step 507 the wait-list is reordered so that those wait-list reservations having the highest probability of materializing are placed at the top of the wait-list. This information is input to the yield management system 314 where it is then processed identical to other reservation requests.

Use of the present invention results in much greater precision in materialization forecasting than the methods and systems of the prior art. By focusing on and analyzing the individual details which cause a reservation to materialize or not materialize, the accuracy of materialization forecasting is improved and the efficiency of wait list promotion is increased significantly.

While the present invention can be used at any time and as often or as little as desired, additional benefits can be obtained by utilizing the invention at certain critical times in a reservation cycle prior to the perishing date. For example, in connection with airline reservations, it can be helpful to update the wait-list several times prior to the materialization departure, e.g., at departure plus 21 days, departure plus 14 days, departure plus 7 days, departure plus 4 days, etc. Having this updated information might allow the airline to make adjustments as needed, such as by discounting fares to make sure reservations that became unmaterialized at the last minute can be sold or by adding additional flights to a schedule if warranted.

Although the present invention has been described with respect to a specific preferred embodiment thereof, various changes and modifications may be suggested to one skilled in the art and it is intended that the present invention encompass such changes and modifications as fall within the scope of the appended claims. For instance, the example described above is directed primarily to an airline reservations system; however, it is understood that the present invention has equal application and the claims herein are intended to cover to any reservation system involving transactions related to perishable commodities. Further, while certain examples of characteristics and traits of the reservations and perishable commodities are given herein, it is not intended to limit the present invention to the gathering and analysis of these characteristics and traits; any characteristics and traits of the perishable commodities may be utilized in connection with the present invention. The programming of the present invention may be implemented by one of ordinary skill in the art of object-oriented programming.

The above-described materialization prediction system and its individually described elements may be implemented in various computing environments. For example, the present invention may be implemented on a conventional IBM PC or equivalent, multi-nodal system (e.g., LAN) or networking system. All programming, algorithms, GUIs, display panels and dialog box templates, metadata and data related thereto are stored in computer memory, static or dynamic, and may be retrieved by the user in any of: conventional computer storage, display (i.e., CRT) and/or hardcopy (i.e., printed) formats.

I claim:

1. In a computer environment, a method for materialization forecasting with respect to wait-listed reservations made by persons for the potential purchase of perishable commodities, comprising the steps of:
    gathering past reservation information relating to past reservations for perishable commodities that have already perished;
    gathering wait list reservation information relating to wait-listed reservations for perishable commodities that have not yet perished;
    comparing, using a processor in said computer environment, said past reservation information and said wait list reservation information;
    calculating, using said processor, based on said comparison, the likelihood that said wait-listed reservations will materialize if promoted to reserved status;
    determining the revenue value of each of said wait-listed reservations;
    ordering said wait-listed reservations based on a combination of their likelihood of materialization and their revenue value; and
    outputting said ordered wait-listed reservations.

2. In a computer environment, a method for materialization forecasting with respect to wait-listed reservations made by persons for the potential purchase of perishable commodities, comprising the steps of:
    gathering past reservation information relating to past reservations for perishable commodities that have already perished;
    gathering wait list reservation information relating to wait-listed reservations for perishable commodities that have not yet perished;
    comparing, using a processor in said computer environment, said past reservation information and said wait list reservation information;
    calculating, using said processor, based on said comparison, the likelihood that said wait-listed reservations will materialize if promoted to reserved status;
    ordering said wait-listed reservations based on their likelihood of materialization; and
    outputting said ordered wait-listed reservations.

3. The method as set forth in claim 2, wherein said past reservation information includes historical commodity details regarding said past reservations.

4. The method as set forth in claim 3, wherein said past reservation information further includes Point-of-Sale (POS) information pertaining to said past reservations.

5. The method as set forth in claim 4, wherein said past reservation information further includes materialization information regarding said past reservations.

6. The method as set forth in claim 5, wherein said past reservation information includes demographic information about persons who made said past reservations.

7. The method as set forth in claim 6, wherein said demographic information includes one or more of the following pertaining to said persons making said past reservations: age, sex, national origin, citizenship, country of residence, occupation, education, annual income, marital status, reservation frequency.

8. The method as set forth in claim 7, wherein said wait list information further includes wait-list commodity details regarding said wait-listed reservations.

9. The method as set forth in claim 8, wherein said wait list information further includes POS information pertaining to said wait-listed reservations.

10. The method as set forth in claim 9, wherein said wait list information includes demographic information about persons making said wait-listed reservations.

11. The method as set forth in claim 10, wherein said demographic information includes one or more of the following pertaining to said persons making said wait-listed reservations: age, sex, national origin, citizenship, country of residence, occupation, education, annual income, marital status, reservation frequency.

12. The method as set forth in claim 11, wherein said perishable commodity comprises airline seats, and wherein said historical commodity details include information related to one or more of the following regarding said airline seats: carrier name, flight origin, flight destination, booking class, flight distance, departure time, connection time, arrival time, departure date, arrival date, flight duration, number of distinct legs comprising a complete one-way itinerary, aircraft type, aircraft capacity.

13. The method as set forth in claim 12, wherein said POS information includes one or more of the following: POS type, POS country, booking carrier, booking recency, change recency, fare code, number of passengers traveling with said individuals making said past reservations, length of stay associated with the reservation, time between booking date and flight date, payment status.

14. The method as set forth in claim 13, wherein said wait-list commodity details include information related to one or more of the following: carrier name, flight origin, flight destination, booking class, flight distance, departure time, connection time, arrival time, departure date, arrival date, flight duration, number of distinct legs comprising a complete one-way itinerary, aircraft type, aircraft capacity.

15. Computer-readable code stored on media and executable on a computer for conducting materialization forecasting with respect to wait-listed reservations made by persons for the potential purchase of perishable commodities, comprising:

first subprocesses for gathering past reservation information relating to past reservations for perishable commodities that have already perished;

second subprocesses for gathering wait list reservation information relating to wait-listed reservations for perishable commodities that have not yet perished;

third subprocesses for comparing said past reservation information and said wait list reservation information;

fourth subprocesses for calculating, based on said comparison, the likelihood that said wait-listed reservations will materialize if promoted to reserved status;

fifth subprocesses for ordering said wait-listed reservations based on their likelihood of materialization; and sixth subprocesses for outputting said ordered wait-listed reservations.

16. The computer-readable code as set forth in claim 15, wherein said past reservation information includes historical commodity details regarding said past reservations.

17. The computer-readable code as set forth in claim 16, wherein said past reservation information further includes Point-of-Sale (POS) information pertaining to said past reservations.

18. The computer-readable code as set forth in claim 17, wherein said past reservation information further includes materialization information regarding said past reservations.

19. The computer-readable code as set forth in claim 18, wherein said past reservation information includes demographic information about individuals who made said past reservations.

20. The computer-readable code as set forth in claim 19, wherein said demographic information includes one or more of the following pertaining to said persons making said past reservations: age, sex, national origin, citizenship, country of residence, occupation, education, annual income, marital status, reservation frequency.

21. The computer-readable code as set forth in claim 20, wherein said wait list information further includes wait-list commodity details regarding said wait-listed reservations.

22. The computer-readable code as set forth in claim 21, wherein said wait list information further includes POS information pertaining to said wait-listed reservations.

23. The computer-readable code as set forth in claim 22, wherein said wait list information includes demographic information about persons making said wait-listed reservations.

24. The computer-readable code as set forth in claim 23, wherein said demographic information includes one or more of the following pertaining to said persons making said wait-listed reservations: age, sex, national origin, citizenship, country of residence, occupation, education, annual income, marital status, reservation frequency.

25. The computer-readable code as set forth in claim 24, wherein said perishable commodity comprises airline seats, and wherein said historical commodity details include information related to one or more of the following regarding said airline seats: carrier name, flight origin, flight destination, booking class, flight distance, departure time, connection time, arrival time, departure date, arrival date, flight duration, number of distinct legs comprising a complete one-way itinerary, aircraft type, aircraft capacity.

26. The computer-readable code as set forth in claim 25, wherein said POS information includes one or more of the following: POS type, POS country, booking carrier, booking recency, change recency, fare code, number of passengers traveling with said persons making said past reservations, length of stay associated with the reservation, time between booking date and flight date, payment status.

27. The computer-readable code as set forth in claim 26, wherein said perishable commodity comprises airline seats, and wherein said wait-list commodity details include information related to one or more of the following: carrier name, flight origin, flight destination, booking class, flight distance, departure time, connection time, arrival time, departure date, arrival date, flight duration, number of distinct legs comprising a complete one-way itinerary, aircraft type, aircraft capacity.

* * * * *